United States Patent [19]
Matsushita et al.

[11] Patent Number: 6,050,196
[45] Date of Patent: Apr. 18, 2000

[54] STORAGE CONVEYOR SYSTEM FOR CARRIER CAR

[75] Inventors: Toshihiro Matsushita, Saitama-ken, Japan; Hitoshi Korenaga, South Hednersonville, Tenn.

[73] Assignee: Tsubakimoto Chain Co., Osaka-fu, Japan

[21] Appl. No.: 09/066,586

[22] Filed: Apr. 27, 1998

[30] Foreign Application Priority Data

Apr. 28, 1997 [JP] Japan ..................................... 9-111169

[51] Int. Cl.[7] .................................................. B61B 10/00
[52] U.S. Cl. .................................... 104/172.3; 104/172.5
[58] Field of Search ........................... 104/26.2, 87, 292, 104/165, 168, 162, 163, 172.1, 172.3, 172.5, 173.1, 242, 245, 247, 249, 250, 251, 259, 178; 198/779, 804, 844.1, 717, 721, 748

[56] References Cited

U.S. PATENT DOCUMENTS

| | | | |
|---|---|---|---|
| 3,412,690 | 11/1968 | Broggie et al. | 104/168 |
| 3,530,800 | 9/1970 | Watkins | 104/168 |
| 3,701,413 | 10/1972 | Leahy et al. | 198/779 |
| 3,912,072 | 10/1975 | Kornylak | 198/779 |
| 4,564,100 | 1/1986 | Moon | 104/168 |
| 5,035,318 | 7/1991 | Kawabata et al. | |
| 5,093,590 | 3/1992 | Murai et al. | |
| 5,819,668 | 10/1998 | Meindl | 104/168 |

FOREIGN PATENT DOCUMENTS 8-2637  1/1996  Japan .

*Primary Examiner*—Mark T. Le
*Attorney, Agent, or Firm*—Armstrong, Westerman, Hattori, McLeland, and Naughton

[57] ABSTRACT

A carrier car, for conveyance by a carrier car conveying chain, may be stopped at a desired position at a work station or in a storage section and re-started from the stopped position. A carrier car conveying chain 3 is disposed in an endlessly entrained fashion on one side of the work station or storage section. Shoe members 2 attached to the underside of the carrier car are supported on conveying rollers 4A and 4B of the conveying chain 3. A traveling track is disposed on the opposite side of the work station or storage section and traveling wheels of the carrier car are supported for rolling movement on the traveling track. The rotational friction force of the conveying rollers is made larger than the rolling friction force of the traveling wheels.

3 Claims, 6 Drawing Sheets

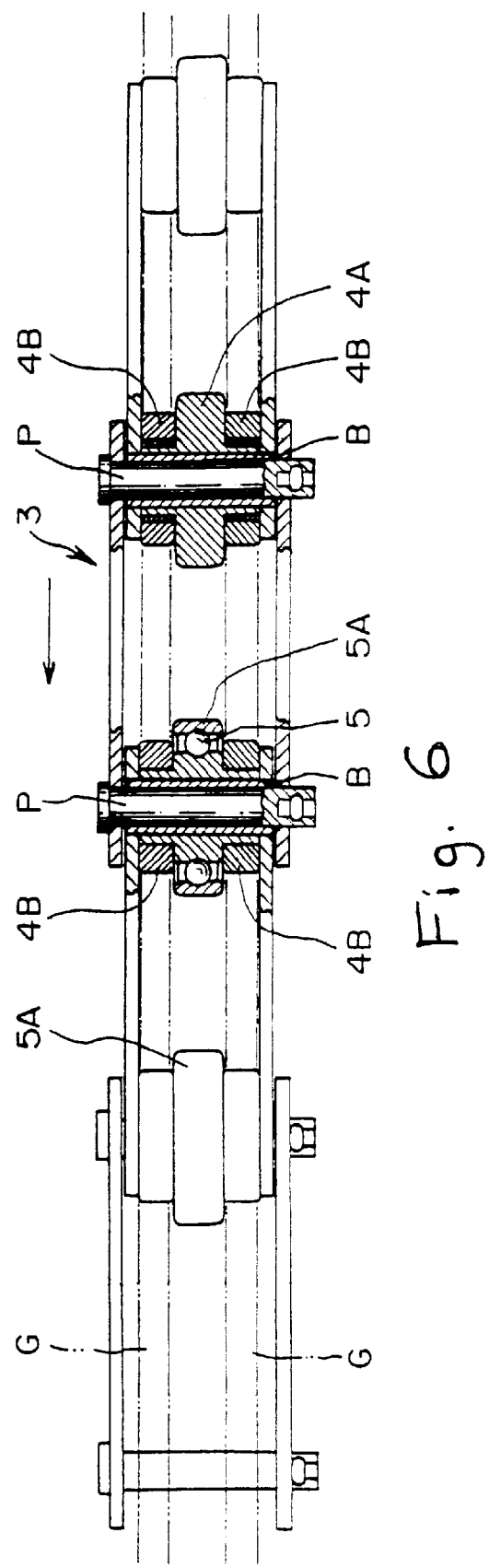

STORAGE CONVEYOR SYSTEM FOR CARRIER CAR

BACKGROUND OF THE INVENTION

1. Field of the Invention

The present invention relates to a conveyor system to be used, for example, in a storage line for allowing a carrier car to be stopped, stored and started at a desired position and a conveyor line for allowing a carrier car with workpieces carried thereon to be conveyed to a processing work line, stopped at a processing work position on a processing line and then conveyed to the next process after completion of work at the processing work position.

2. Description of the Prior Art

According to the prior art, a carrier car is advanced and stopped by raising and bringing down carrier car pushing pawls attached at equal intervals to a carrier car conveying chain which is driven circulatively in an endless manner.

For example, in the storage system disclosed in Japanese Patent Laid Open No. 2637/96, in order to stop a carrier car at a processing work position on a processing line, a cam plate for bringing down carrier car pushing pawls to disengage the pawls from the carrier car is disposed so that it can pop in and out.

In the prior art referred to above, since the mounting position of the cam plate for bringing down the carrier car pushing pawls is fixed, the start position for bringing down the pushing pawls cannot be changed according to whether the carrier car is long or short. Consequently, a longitudinally central position of the carrier car cannot be stopped at a predetermined position, thus causing a discrepancy between the stopped position of the carrier car and the predetermined stop position for work.

SUMMARY OF THE INVENTION

The present invention has solved the above-mentioned problem by providing a storage conveyor system for a carrier car, wherein shoe members each having a bearing surface spaced upward from a traveling track surface of traveling wheels are attached to the underside of the carrier car longitudinally on at least one of the right side and the left side of the carrier car between the traveling wheels. A carrier car conveying chain is disposed to support one side of the carrier car. The carrier car conveying chain has a number of conveying rollers rotatably mounted through axles. The conveying rollers bear the load of the carrier car on the one side while supporting the bearing surfaces of the shoe members. A traveling track bears the load of the carrier car longitudinally on the opposite side of the carrier car through the traveling wheels on the opposite side of the carrier car, and a rotational friction resistance value of the conveying rollers of the carrier car conveying chain disposed on the one side of the carrier car is set larger than a rolling friction resistance value of the traveling wheels rolling on the traveling track disposed on the opposite side of the carrier car.

One side of the carrier car is carried on the conveying rollers of the carrier car conveying chain, while the opposite side thereof is carried on the traveling track through the traveling wheels, and the rotational resistance of the conveying rollers is larger than the rolling resistance of the wheels. Therefore, as the carrier car conveying chain is driven circulatively, the carrier car moves together with the chain while being carried on the conveying rollers, and the traveling wheels roll on the traveling track surface and move in the chain driving direction.

When the carrier car is stopped with an external force, the traveling wheels stop on the traveling track, the conveying rollers of the carrier car conveying chain idle, and the conveying chain continues to move without interruption.

Accordingly, without stopping movement of the carrier car conveying chain, the carrier car can be stopped at any position with an external force, and by removing the external force the carrier car can be started again from the stopped position.

BRIEF DESCRIPTION OF THE DRAWINGS

FIG. 6 is a plan view, partially in section of the conveying chain of FIG. 5.

DETAILED DESCRIPTION OF A PREFERRED EMBODIMENT

Figure 1:
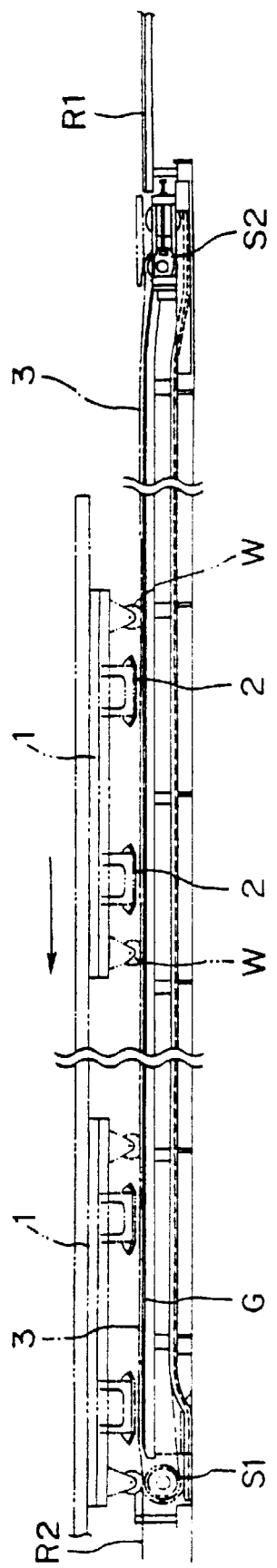
FIG. 1 is a front view showing an embodiment of the storage conveyor system of the present invention.
Figure 2:
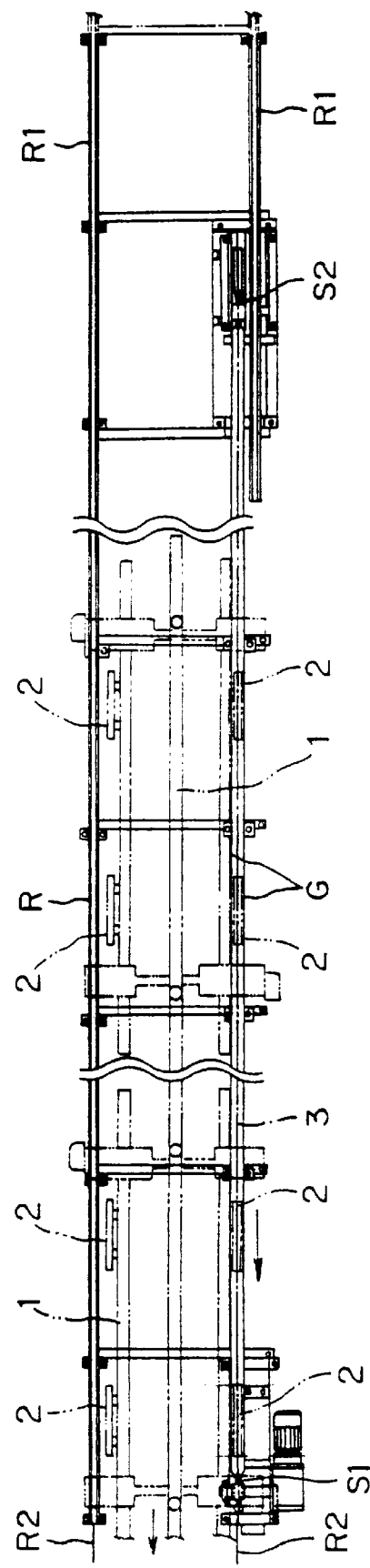
FIG. 2 is a plan view of the storage conveyor system of FIG. 1.

With reference to the drawings, FIGS. 1 and 2 are front and plan views, respectively, of a storage conveyor system embodying the present invention. Wheels W with bearings mounted at the four corners of a carrier car 1 roll on spaced incoming tracks R1, R1 and reach a working line inlet, whereupon bearing surfaces 2' of shoe members 2 disposed on one side of the carrier car rest on conveying rollers 4A and 5A (see FIGS. 5 and 6) of a carrier car conveying chain 3. The chain 3 is entrained in an endless fashion on both a driving sprocket S1 located at one end in the longitudinal direction of the working line and a driven sprocket S2 located at the opposite end. The load of the carrier car on the said one side of the car is imposed on the conveying rollers 4A and 5A of the carrier car conveying chain 3 through the shoe members 2 and therefore there is no need for a track for the carrier car traveling wheels on the said one side of the carrier car.

A working line track R is disposed on the side of the working line opposite from the conveying chain 3. The working line track R is connected to one of the incoming tracks R1 to support the wheels W located on the side of the carrier car opposite from the conveying chain 3, thereby bearing the car load longitudinally on the opposite side of the carrier car.

The carrier car 1 is conveyed in the direction indicated by the arrow on the working line by means of the carrier car conveying chain 3, and at a predetermined working position or a desired position on the working line the carrier car 1 is stopped with an external force while permitting continuous movement of the chain 3. When the external force is removed after the completion of work, the carrier car starts moving again by virtue of a difference between frictional resistances acting on each of the two sides of the carrier car which will be described later.

When the carrier car arrives at a working line outlet, the shoe members 2 located on one side of the carrier car are disengaged from the conveying rollers 4A and 5A of the carrier car conveying chain, and the wheels located on that side of the carrier car are supported on an outgoing rail R2, while the wheels on the opposite side of the carrier car advance onto an outgoing rail R2 connected to the working line track R. The carrier car is moved to a desired position on the outgoing rail R by means of the wheels W mounted at the four corners of the carrier car 1.

Figure 3:
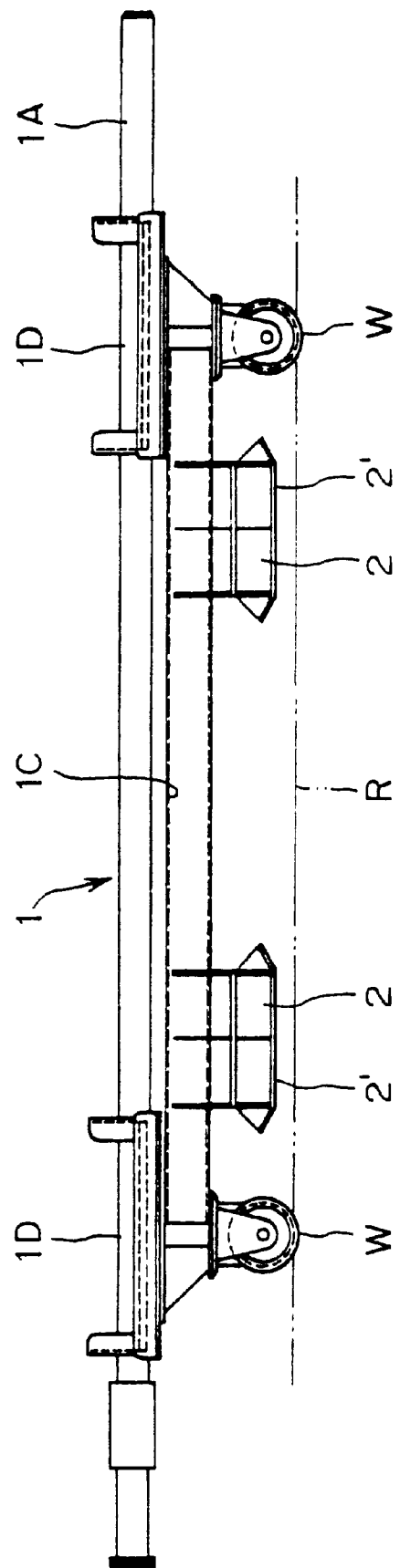
FIG. 3 is a front view of a carrier car of the storage conveyor system of the present invention.
Figure 4:
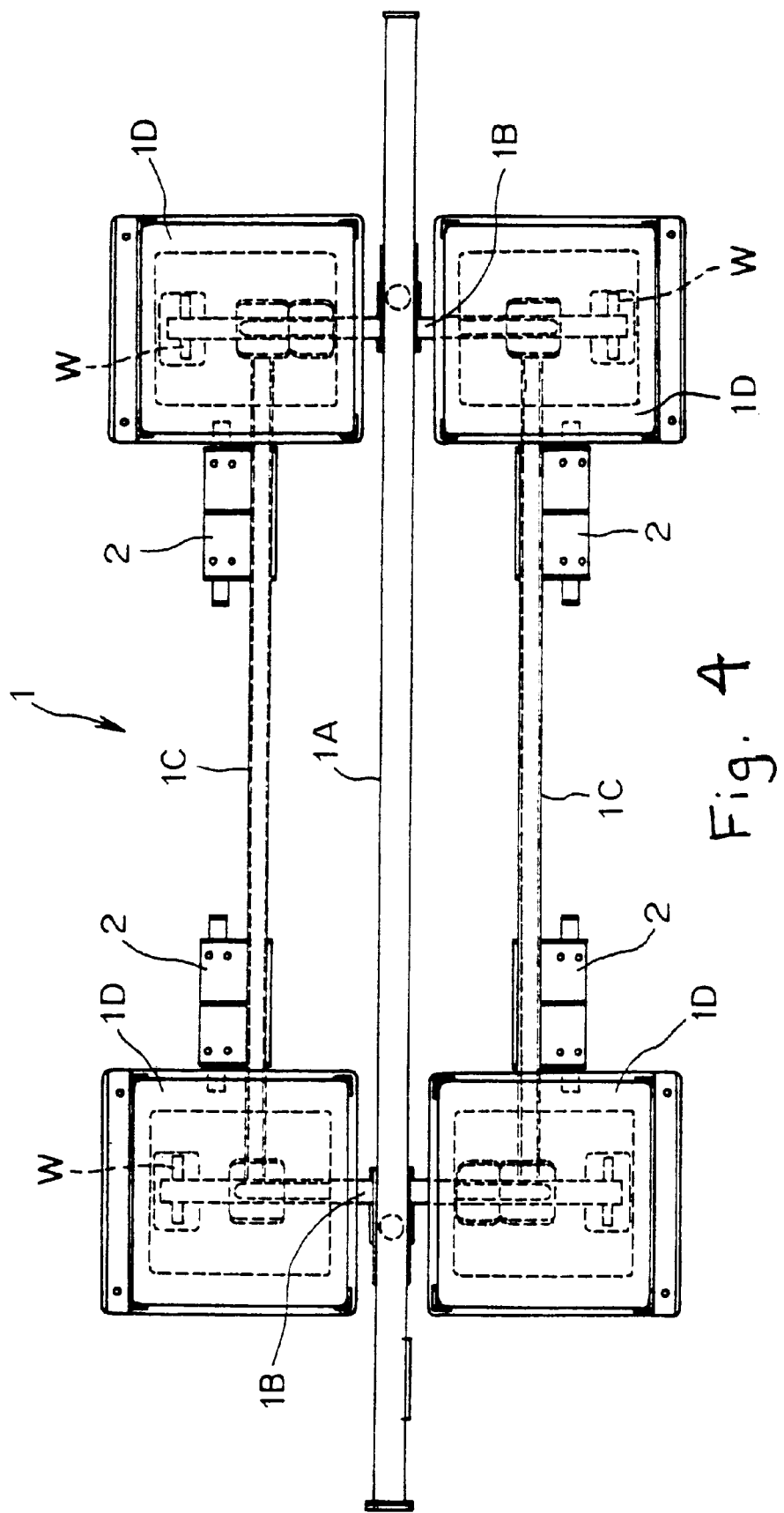
FIG. 4 is a plan view of the carrier car of FIG. 3.

FIGS. 3 and 4 are a front view and a plan view, respectively, of a carrier car of the present invention. The carrier car 1 is constituted by a rectangular frame comprising a central, longitudinal frame 1A, a pair of transverse frames 1B, 1B orthogonal to the central frame 1A and located at front and rear positions, and a pair of side frames 1C, 1C which connect both end portions of the paired transverse frames 1B, 1B. At the four corners of the rectangular frame are mounted articles to be conveyed, for example, support plates 1D for carrying the body of an automobile. Traveling wheels W of the carrier car are mounted to the undersides of the support plates 1D. Shoe members 2 are suspended from the undersides of the paired side frames 1C, 1C longitudinally on both sides of the car between the traveling wheels W. The shoe members 2 have bearing surfaces 2' isolated or spaced upward from a traveling track surface R on which the wheels W rotate.

With shoe members 2 suspended from each of the paired side frames 1C, 1C, it is possible for the carrier car to travel in the direction indicated by the arrows in the drawings and in a reverse direction. However, in the case where the carrier car 1 does not have to travel in a reverse direction, the shoe members 2 may be attached to only one side frame 1C above the conveying chain 3.

The traveling wheels W of the carrier car are each rotatably mounted on an axle through a ball-and-roller bearing to reduce the rolling resistance value of the wheels W rolling on the traveling track.

Now, with reference to FIGS. 5 and 6, a description will be given of a carrier car conveying chain 3 of the present invention, which chain drives the carrier car while supporting the bearing surfaces 2' of the shoe members 2.

Figure 5:
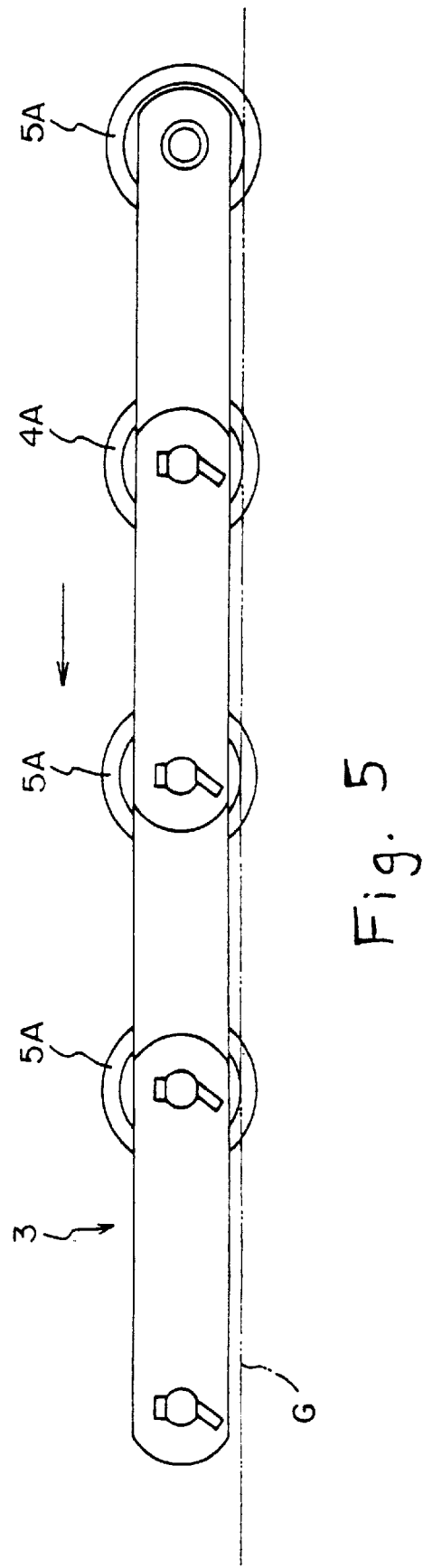
FIG. 5 is a front view of a principal portion of a carrier car conveying chain of the present invention.

The carrier car conveying chain 3 shown in FIGS. 5 and 6 includes conveying rollers 4A having a large rotational friction resistance value through plain bearings and conveying rollers 5A having a small rotational friction resistance value through ball-and-roller bearings. The conveying rollers 4A and 5A are arrayed in a mixedly arranged state.

The conveying rollers 4A of a large rotational friction resistance value each comprise a bushing B fitted on a chain link connecting pin P and press-fitted at both ends in connecting pin insertion holes of inner links, a conveying roller 4A of a large diameter rotatably fitted on the bushing B, and a pair of traveling rollers 4B, 4B of a small diameter adapted to roll on guide rails G. The traveling rollers 4B, 4B are rotatably fitted on cylindrical portions extending from both-side boss portions of the conveying roller 4A. The outer peripheral surface of the bushing B and the inner peripheral surfaces of the conveying roller 4A and of the said cylindrical portions are borne by a plain bearing, to constitute the conveying roller 4A of a large rotational friction resistance value having a sliding friction. Further, plain bearings are formed by both the outer peripheral surfaces of the above extended cylindrical portions of the conveying roller 4A and the inner peripheral surfaces of the traveling rollers 4B. The traveling rollers 4B and the conveying roller 4A rotate substantially integrally by virtue of a sliding friction force of the said plain bearings, whereby the conveying speed of the article carried on the outer peripheral surface of the conveying roller 4A is increased relative to the traveling speed of the rollers 4B. That is, what is called a double-speed conveying roller is formed.

As to the conveying roller 5A of a small rotational friction resistance value, it is of the same diameter as the conveying roller 4A of a large rotational friction resistance value and is adapted to rotate through a ball-and-roller bearing 5. The other constructional elements of the roller 5A are the same as the roller 4A.

Therefore, when the carrier car conveying chain 3 is driven while the load on one of the right and the left sides of the carrier car is borne on the conveying rollers 4A and 5A of the carrier car conveying chain through the shoe members 2 and while the load on the opposite side is borne on the traveling track through the traveling wheels W, since the conveying rollers 4A of a large rotational friction resistance value using plain bearings and the conveying rollers 5A of a small rotational friction resistance value are mounted in a mixedly arranged state on the carrier car conveying chain 3, the total rotational friction resistance value of the conveying rollers 4A and 5A for the carrier car can be made larger than the rolling friction resistance of the traveling wheels W having ball-and-roller bearings. As a result, the carrier car moves together with the carrier car conveying chain 3, and when the foregoing double-speed conveying roller is used, the traveling speed of the carrier car is increased relative to the moving speed of the chain 3.

When the carrier car is stopped with an external force, the conveying rollers 4A and 5A idle and pass the bearing surfaces 2' of the shoe members 2, permitting movement of the carrier car conveying chain 3 while the carrier car remains stopped.

Although in the above embodiment the conveying rollers 4A of a large rotational friction resistance are constructed as double-speed conveying rollers by a friction drive of the traveling rollers 4B, it is not always necessary to do so. A chain with top rollers wherein conveying rollers are supported rotatably on a carrier car conveying chain may also be used.

As to the number of the conveying rollers 4A of a large rotational friction resistance, any number may be selected which is appropriate to the design.

Thus, in the present invention, a driving force for conveying the carrier car is obtained by a frictional engagement between the shoe members provided on the lower surface of the carrier car on one side thereof and the conveying rollers of the carrier car conveying chain. The rotational friction resistance of the conveying rollers is larger than the rolling friction resistance of the traveling wheels of the carrier car, so when an external force for stopping the travel of the carrier car is not exerted on the car, the car travels together with the carrier car conveying chain, while upon exertion of such external force on the carrier car, the car stops. However, since the conveying rollers roll on the bearing surfaces of the shoe members and permit movement of the carrier car conveying chain, the movement of the chain is not stopped and the carrier car can be stopped at any desired position by application of an external stopping force. Therefore, even with variations in carrier car length, a longitudinally central position of the carrier car can be accurately and easily stopped at a desired working position. It is also possible to easily store the carrier car at a desired position.

Where the double-speed conveying rollers are mounted to the carrier car conveying chain, the carrier car conveying speed becomes higher than the moving speed of the conveying chain, and thus the moving speed of the chain can be decreased to reduce the traveling noise of the chain.

What is claimed is:

1. A storage conveyor system for a carrier car having traveling wheels attached at each end to an underside thereof for rolling movement on a pair of spaced traveling tracks, comprising:

a plurality of shoe members each having a bearing surface spaced upward from a traveling wheel track surface, said shoe members being attached to the underside of the carrier car longitudinally on at least one of the right side and the left side of the carrier car, a carrier car conveying chain disposed on one side of said carrier car, said carrier car conveying chain having a number of conveying rollers rotatably mounted on axles which rollers bear the load of the carrier car on said one side by supporting the bearing surfaces of said shoe members, a traveling track disposed on the side of the carrier car opposite from said conveying chain, said traveling track bearing the load of the carrier car longitudinally on said opposite side of the carrier car through the traveling wheels on said opposite side of said carrier car, and a rotational friction resistance value of the conveying rollers of said carrier car conveying chain disposed on said one side of said carrier car is set larger than a rolling friction resistance value of the traveling wheels rolling on said traveling track disposed on said opposite side of said carrier car.

2. A carrier car for a carrier storage conveyor having traveling wheels attached at each end to an underside thereof for rolling movement of a pair of spaced traveling tracks, the carrier storage conveyor including a carrier car conveying chain having a number of conveying rollers, the improvement comprising:

a plurality of shoe members each having a bearing surface spaced upward from a traveling wheel track surface, said shoe members being attached to the underside of the carrier car longitudinally on at least one of the right side and the left side of the carrier car, said bearing surface of each of said shoe members disposed on said at least one side of said carrier car being engageable with the conveying rollers of the carrier car conveying chain to provide an alternate support means at said at least one side of said carrier car.

3. A storage conveyor system according to claim 1, wherein said conveying rollers include a combination of a plurality of first conveying rollers each journaled rotatably through a sliding bearing and a plurality of second conveying rollers each journaled rotatably through a rolling bearing.

* * * * *